(12) United States Patent
Fukutani

(10) Patent No.: US 6,513,335 B2
(45) Date of Patent: Feb. 4, 2003

(54) DEVICE FOR SUPPLYING SEAL AIR TO BEARING BOXES OF A GAS TURBINE ENGINE

(75) Inventor: Masayuki Fukutani, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/867,386

(22) Filed: May 31, 2001

(65) Prior Publication Data

US 2001/0047651 A1 Dec. 6, 2001

(30) Foreign Application Priority Data

Jun. 2, 2000 (JP) ........................................ 2000-165274

(51) Int. Cl.[7] ................................................ F02C 7/06
(52) U.S. Cl. ........................ 60/785; 60/39.08; 415/176
(58) Field of Search ................................ 60/39.08, 785; 415/176

(56) References Cited

U.S. PATENT DOCUMENTS

| | | | |
|---|---|---|---|
| 2,951,337 A | * 9/1960 | Atkinson et al. | 60/39.08 |
| 3,844,110 A | * 10/1974 | Widlansky et al. | 60/39.08 |
| 4,717,000 A | * 1/1988 | Waddington et al. | 60/39.08 |
| 5,611,661 A | 3/1997 | Jenkinson | |
| 5,619,850 A | * 4/1997 | Palmer et al. | 60/785 |

* cited by examiner

Primary Examiner—Louis J. Casaregola
(74) Attorney, Agent, or Firm—Arent Fox Kintner Plotkin & Kahn, PLLC

(57) ABSTRACT

Provided is a device for supplying seal air to the bearings of a gas turbine engine which allows the seal pressure to be kept even between the front and rear gear boxes without complicating the passages for supplying the seal air to the bearing boxes. Sealing air drawn from a part of high pressure compressor is conducted through passages defined between the inner periphery of the rotors of the high pressure compressor and a high pressure turbine and the outer periphery of the outer shaft, and is distributed to the front and rear bearing boxes. By appropriately providing narrowed parts in these passages, seal air is evenly distributed between the front and rear bearing boxes. Thus, even in case of a failure of one of the oil seals, any concentrated leakage of the lubricating oil can be avoided.

5 Claims, 3 Drawing Sheets

DEVICE FOR SUPPLYING SEAL AIR TO BEARING BOXES OF A GAS TURBINE ENGINE

TECHNICAL FIELD

The present invention relates to a device for supplying seal air to bearings of a gas turbine engine.

BACKGROUND OF THE INVENTION

In a multiple-shaft bypass jet engine, an inner shaft supporting the rotors of a low pressure compressor and a low pressure turbine and an outer shaft supporting the rotors of a high pressure compressor and a high pressure turbine typically consist of hollow shafts which are coaxially nested with each other. The outer and inner shafts are supported by separate bearings at their front and rear ends, and each bearing is lubricated by a forced lubrication system which blows lubricating oil fed by a pump to the bearing.

In such a forced lubricating system, to positively prevent the lubricating oil from leaking out of the bearing boxes provided in the front and rear ends of the outer and inner shafts, high pressure air drawn from one of the compressors is conducted to the exterior of the oil seals of the bearing boxes to keep the interior of the bearing boxes at a lower pressure than the supporting part.

The high pressure air which is supplied to the exterior of the bearing boxes may consist of the high pressure air produced by the high pressure compressor to be used in the combustion chambers, the passages for the seal air, in particular for the front bearing box, tends to be highly complex because of the presence of an intake duct in front of the high pressure compressor.

To deal with such a problem, it has been proposed to provide an outlet to each of an intermediate part of the impeller casing of the centrifugal compressor and an outer peripheral part of a back side of the centrifugal compressor so as to provide separate seal air supply passages for the seal portions of the front and rear gear boxes and minimize the length of the seal air passages.

However, because the air pressure from the centrifugal compressor varies depending on the point of drawing the high pressure air, supplying seal air to the seal portions via separate passages and from different points of drawing the high pressure air causes an evenness in the seal pressure between the front and rear gear boxes. Therefore, in case of a failure of a mechanical seal, the lubricating oil may be blown toward the part of the lower seal pressure.

BRIEF SUMMARY OF THE INVENTION

In view of such problems of the prior art, a primary object of the present invention is to provide a device for supplying seal air to the bearings of a gas turbine engine which allows the seal pressure to be kept even between the front and rear gear boxes without complicating the passages for supplying the seal air to the bearing boxes.

A second object of the present invention is to provide a device for supplying seal air to the bearings of a gas turbine engine which would prevent any serious loss of lubricating oil even when one of the seals should fail.

A third object of the present invention is to provide a device for supplying seal air to the bearings of a gas turbine engine which would not complicate the structure of the engine.

According to the present invention, such objects can be accomplished by providing a device for supplying seal air to bearing boxes of a gas turbine engine, comprising: an inner shaft connected to a low pressure compressor and a low pressure turbine; an outer shaft, coaxially disposed with respect to the inner shaft, connected to a high pressure compressor and a high pressure turbine; a front and a rear inner shaft bearings supporting a front and a rear end of the inner shaft, respectively; a front and a rear outer shaft bearings supporting a front and a rear end of the inner shaft, respectively; a front bearing box substantially enclosing the front inner shaft and front outer shaft bearings, the front bearing box being separated into an outer chamber exposed to a front end of the front inner bearing and a rear end of the front outer bearing, and an inner chamber exposed to a rear end of the front inner bearing and a front end of the front outer bearing; a rear bearing box substantially enclosing the rear outer shaft and rear inner shaft bearings, the rear bearing box being separated into an outer chamber exposed to a front end of the rear outer bearing and a rear end of the rear inner bearing, and an inner chamber exposed to a rear end of the rear outer bearing and a front end of the rear inner bearing; a hollow connecting shaft extending coaxially between rotors of the high pressure compressor and the high pressure turbine; a first passage having a first end communicated with a part of the high pressure compressor and a second end communicated with an annular gap defined between the connecting shaft and outer shaft; a second passage extending along an outer periphery of the outer shaft and having a first end communicated with the annular gap and a second end communicated with the outer chamber of the front bearing box; and a third passage extending along an outer periphery of the outer shaft and having a first end communicated with the annular gap and a second end communicated with the outer chamber of the rear bearing box.

Thus, the seal air drawn from a single point of the compressor can be supplied to both the front and rear bearing boxes evenly without complicating the passages. The inner chamber of each of the bearing boxes typically communicates with an annular gap between the inner and outer shafts, and is appropriately drained or vented out of the inner chamber after separating oil from the air flow.

In particular, if the second and third passages each include a part having a narrow cross section than that of the first passage, the seal pressure between the two seal portions can be made highly uniform. Furthermore, because of the flow restricting action of such narrowed parts, even if one of the seals is damaged, because the seal pressure drops only in the affected bearing box, a concentrated oil leakage from the damaged seal can be avoided while the seal pressure in the undamaged bearing box is maintained.

Also, if the second end of the first passage comprises a circumferentially elongated slot formed in the connecting shaft for introducing the high pressure air to the inner periphery of the rotor of the high pressure compressor, the stress acting on the peripheral part of the hole due to the centrifugal force can be reduced, and the admission of the swirling flow due to the rotation of the rotor of the compressor into the first passage is favorably promoted.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
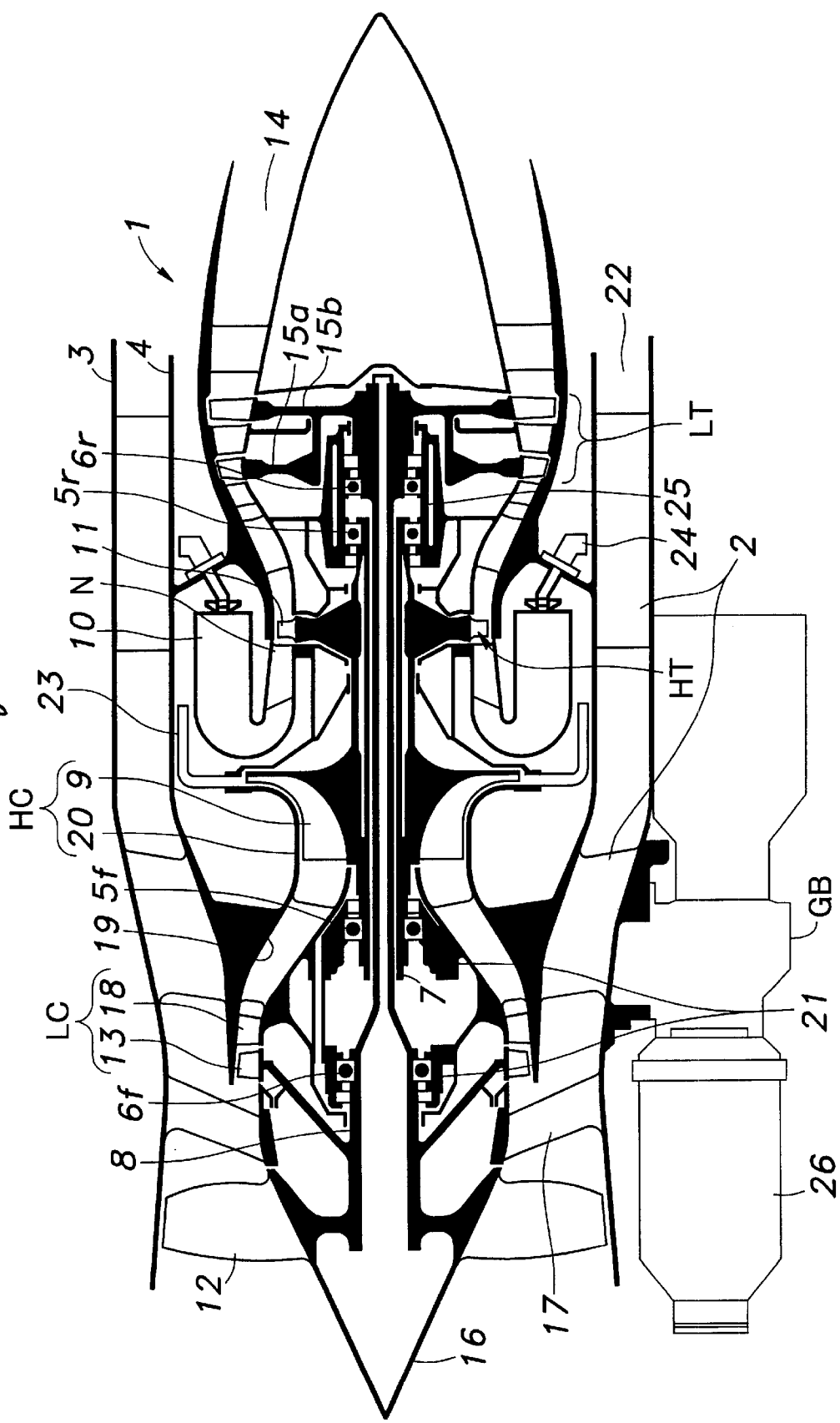
FIG. 1 is schematic sectional view of a bypass jet engine embodying the present invention.

FIG. 1 is a schematic view of a multiple shaft bypass jet engine embodying the present invention. This engine 1 comprises an outer casing 3 and an inner casing 4 consisting of coaxially arranged cylindrical members joined by straightening vanes 2, and an outer shaft 7 and an inner shaft 8 consisting of coaxially arranged hollow shafts centrally supported in the casings by independent bearings 5f, 5r, 6f and 6r.

The outer shaft 7 has a front end integrally carrying an impeller wheel 9 of a high pressure centrifugal compressor HC, and a rear end integrally carrying a high pressure turbine wheel 11 of a high pressure turbine HT.

The inner shaft 8 has a front end integrally carrying a front fan 12 and a compressor wheel 13 supporting rotor vanes for a low pressure axial flow compressor LC immediately behind the front fan 12, and a rear end integrally carrying a pair of turbine wheels 15a and 15b supporting rotor vanes placed in a combustion gas flow in a jet duct 14 so as to form a low pressure turbine LT.

A nose cone 16 is centrally provided on the front fan 12, and stator vanes 17 are provided behind the nose cone 12 with their outer ends attached to the inner circumferential surface of the outer casing 3.

Stator vanes 18 of the low pressure axial flow compressor LC are disposed on the inner circumferential surface of a front end portion of the inner casing 4. Behind the stator vanes 18 are provided an intake duct 19 for conducting the air drawn by the front fan 12 and pre-compressed by the low pressure axial flow compressor LC to the high pressure centrifugal compressor HC, and an impeller casing 20 of the high pressure centrifugal compressor HC. The inner peripheral part of the intake duct 19 is integrally provided with a bearing box 21 for the bearings 5f and 6f which support the front ends of the outer shaft 7 and inner shaft 8, respectively.

The air drawn by the front fan 12 is in part forwarded to the high pressure centrifugal compressor HC via the low pressure axial flow compressor LC as mentioned earlier, and the remaining larger amount of air having a relatively low velocity is expelled rearward through a bypass duct 22 defined between the outer casing 3 and inner casing 4 to provide a primary thrust in the low speed range.

To the outer periphery of the high pressure centrifugal compressor HC is connected a diffuser 23 so as to provide a high pressure air to reverse flow combustion chambers 10 provided downstream of the diffuser 23.

In each of the reverse flow combustion chambers 10, the fuel ejected from a fuel injection nozzle 24 provided on the rear end of the combustion chamber 10 is mixed with the high pressure air supplied from the diffuser 23, and is combusted. The combustion gas which is expelled from the nozzle N of each combustion chamber 10 which is directed rearward is ejected to the atmosphere via the jet duct 14, and provides a primary thrust in the high speed range.

The inner peripheral part of the jet duct 14 is integrally provided with a bearing box 25 for the bearings 5r and 6r which support the rear ends of the outer shaft 7 and inner shaft 8, respectively.

The outer shaft 7 of the engine 1 is connected to an output shaft of a starter motor 26 via a gear mechanism now shown in the drawings. As the starter motor 26 is activated, the impeller wheel 9 of the high pressure centrifugal compressor HC is driven, along with the outer shaft 7, and this causes high pressure air to be supplied to the reverse flow combustion chambers 10. When fuel mixed with this high pressure air combusts, the resulting pressure of the combustion gas drives the turbine wheel 11 of the high pressure turbine HT and the turbine wheels 15a and 15b of the low pressure turbine LT. The rotational power of the high pressure turbine wheel 11 drives the impeller wheel 9 of the high pressure centrifugal compressor HC, and the rotational power of the turbine wheels 15a and 15b of the low pressure turbine LT drives the compressor wheel 13 of the low pressure axial flow compressor LC. As the high pressure turbine wheel 9 and low pressure turbines 15a and 15b are driven by the jet pressure of the combustion gas, the engine 1 maintains its rotation according to a negative feedback balance between the amount of fuel supply and the amount of intake air.

Figure 2:
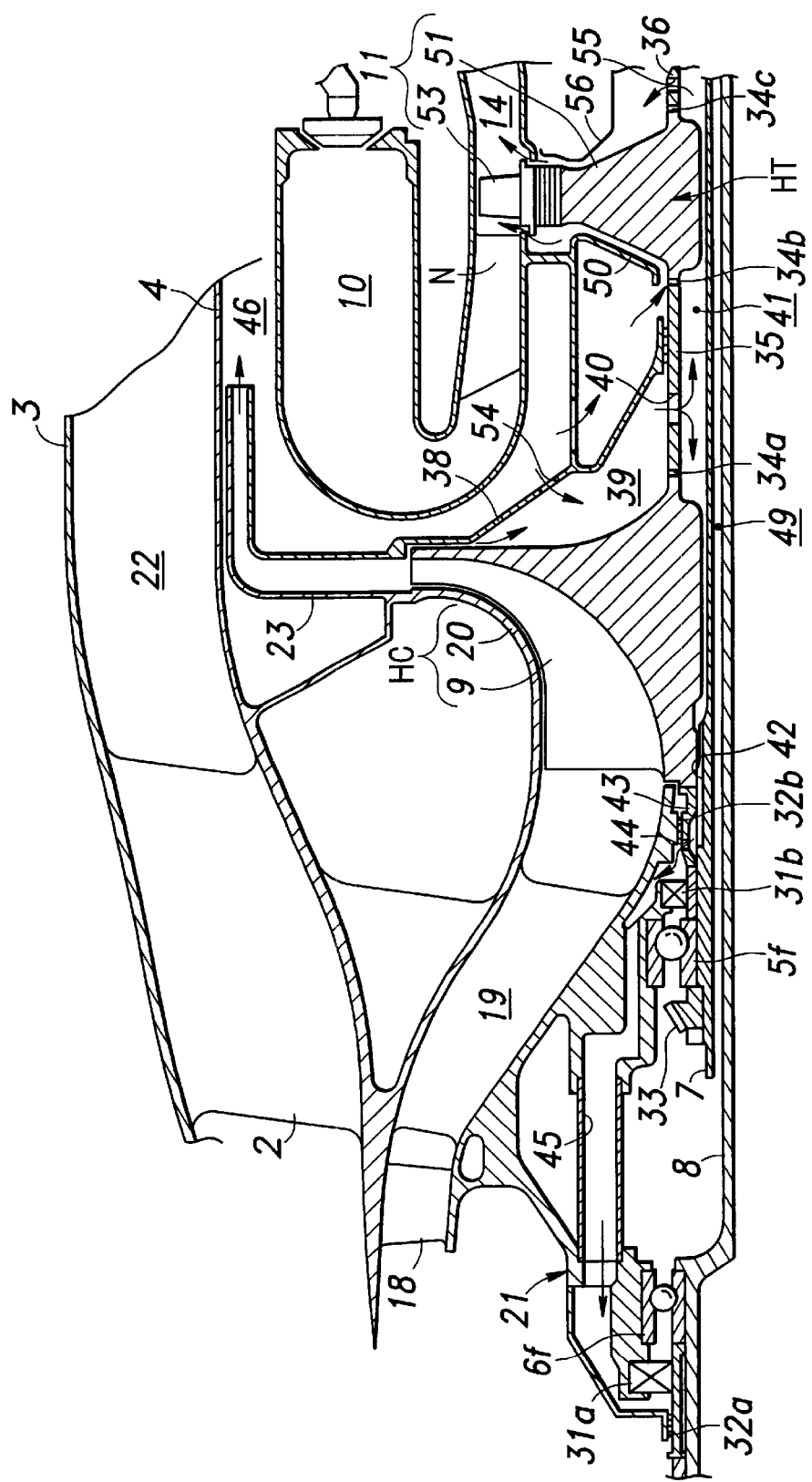
FIG. 2 is an enlarged fragmentary sectional view of a front part of the jet engine shown in FIG. 1.
Figure 3:
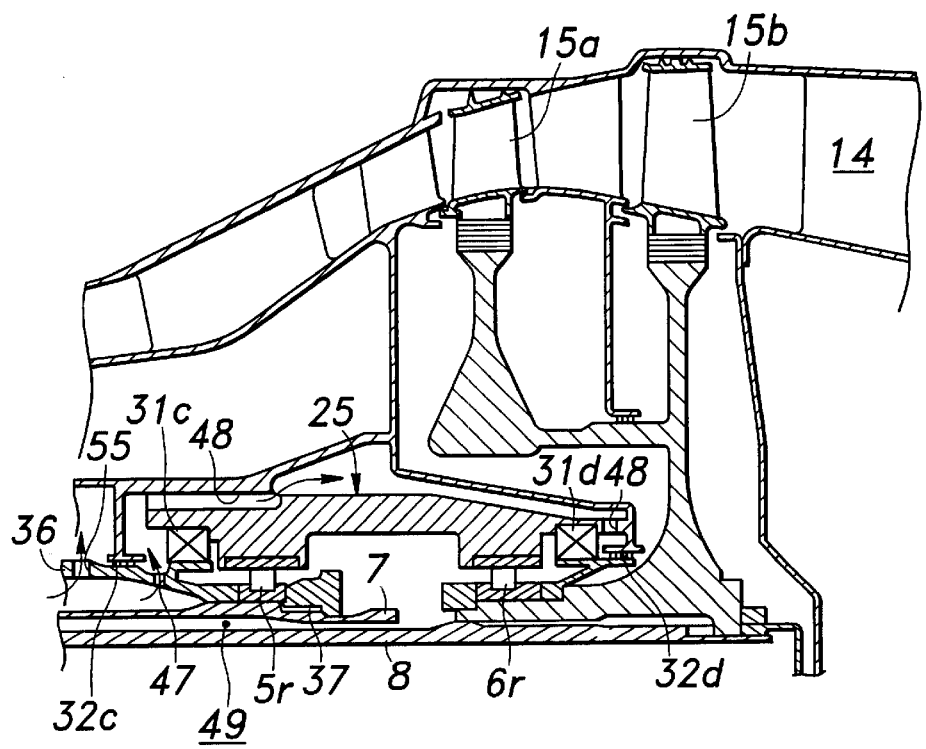
FIG. 3 is an enlarged fragmentary sectional view of a rear part of the jet engine shown in FIG. 1.

As illustrated in FIG. 2, support parts for the bearing 5f supporting the front end of the outer shaft 7 and the bearing 6f supporting the front end of the inner shaft 8 are provided at a certain distance from each other in the axial direction. As illustrated in FIG. 3, support parts for the bearing 5r supporting the rear end of the outer shaft 7 and the bearing 6r supporting the rear end of the inner shaft 8 are provided at a certain distance from each other in the axial direction.

Floating ring seals 31a and 31b are provided ahead of the front bearing 6f of the inner shaft 8 and behind the front bearing 5f of the outer shaft 7, respectively, in the front bearing box 21, and floating ring seals 31c and 31d are provided ahead of the rear bearing 5r of the outer shaft 7 and behind the rear bearing 6r of the inner shaft 8, respectively, in the rear bearing box 25, to prevent the lubricating oil supplied to the various bearings from leaking out of the bearing boxes 21 and 25. Labyrinth seals 32a to 32d are provided between the front and rear ends of the bearing boxes 21 and 25 and the opposing outer circumferential surfaces of the inner and outer shafts 7 and 8, respectively.

The front end of the outer shaft 7 is connected to the inner race of the front bearing 5f and a bevel gear 33 for the starter motor, and fits into an axially front end of the impeller wheel 9 via a spline coupling.

A front central shaft end of the turbine wheel 11 is connected to the axial center of the back side of the impeller wheel 9 via a hollow connecting shaft 35 having Curvic (tradename) couplings 34a and 34b on either axial end thereof. The axial center of the back side of the turbine wheel 11 is connected to a collar 36 and serving as an extension of the connecting shaft 35 and fitted with a labyrinth seal 32c adjacent to a bearing portion on the rear end of the outer shaft 7 via a Curvic coupling 34c.

The impeller wheel 9, hollow connecting shaft 35, turbine wheel 11, collar 36 and inner race of the bearing 5r on the rear end of the out shaft 7 are fitted onto the outer shaft 7, in this order, and a bearing nut 37 threaded onto the outer shaft 7 applies a prescribed initial tension to the outer shaft 7.

Behind the impeller wheel 9 is defined an impeller back chamber 39 by a back plate 38, and the output pressure of the high pressure centrifugal compressor HC prevails in the impeller back chamber 39.

The hollow connecting shaft 35 is provided with a circumferentially elongated slot 40 to communicate an annular gap 41 defined between the inner circumferential surface of the connecting shaft 35 or the axial center of the impeller wheel 9 and the outer circumferential surface of the outer shaft 7 with the impeller back chamber 39. Because the opening provided in the hollow connecting shaft 35 consists of the circumferentially elongated slot 40, the stress acting on the inner periphery of the opening due to the centrifugal force can be minimized, and the swirl resulting from the impeller wheel 9 is more favorably guided into the interior of the hollow connecting shaft 35. Furthermore, because the axial dimension of the opening is smaller for a given opening area, the distance between the Curvic coupling 34a and the edge of the slot 40 can be maximized so that the influence on the mechanical strength of the part associated with the Curvic coupling 34a can be minimized.

The spline coupling part of the impeller wheel 9 is provided with axial grooves 42, and the collar 43 fitted with the labyrinth seal 32b at the front end of the central shaft of the impeller wheel 9 is provided with an orifice 44 which communicates the spline coupling part with the interior of a rear part of the front bearing box 21.

A plurality of passages 45 communicating a front part of the bearing box 21 with a rear part thereof are provided at a regular interval along a circle. The combined cross sectional area of the passages 45 is sufficiently greater than the cross sectional area of the orifice 44 which was mentioned earlier.

The high pressure air compressed by the high pressure centrifugal compressor HC in most part flows into a high pressure chamber 46 accommodating the reverse flow combustion chambers 10, via the diffuser 23, and the remaining part of the high pressure air flows into the impeller back chamber 39 from the outer periphery of the impeller wheel 9. The high pressure air is then flows into the annular gap 41 defined between the inner circumferential surface of the connecting shaft 35 or the axial center of the impeller wheel 9 and the outer circumferential surface of the outer shaft 7 from the slot 40 of the hollow connecting shaft 35 exposed to the impeller back chamber 39, and reaches a part at which the floating ring seal 31b is mounted behind the outer shaft support bearing 5f of the front bearing box 21. Thereafter, the high pressure air reaches a part at which the floating ring seal 31a is mounted in front of the inner shaft support bearing 6f in the front bearing box 21, via the passages 45 communicating the front and rear parts of the front bearing box 21 to each other.

More specifically, the front bearing box 21 is divided into an outer chamber and an inner chamber. The outer chamber includes the communicating passages 45 and the parts exposed to the front end of the ring seal 31a adjoining the front end of the front inner shaft bearing 6f and the rear end of the ring seal 31b adjoining the rear end of the front outer shaft bearing 5f. The inner chamber includes the parts exposed to the rear end of the front inner shaft bearing 6f and the front end of the front outer shaft bearing 5f, and communicates with the annular gap 49 defined between the outer and inner shafts 7 and 8.

The partition wall separating the impeller back chamber 39 from the high pressure chamber 46 is provided with an orifice 54 for adjusting the back pressure so that the inner pressure of the impeller back chamber 39 which has a significant influence on the pressure balance of the shafts as a whole can be maintained at an appropriate level by supplying the high pressure air to the impeller back chamber 39 from the high pressure chamber 46.

The high pressure air introduced into the outer chamber of the front gear box 21 or the parts on which the floating ring seals 31a and 31b are mounted in the front and rear parts of the front bearing box 21 allows the external pressure of the front bearing box 21 to be kept higher than the inner pressure thereof so that the leakage of lubricating oil from the front bearing box 21 can be avoided. This seal pressure is retained by virtue of the labyrinth seals 32a and 32b.

The foregoing description covered only the supply passage for the seal air for the front bearing box 21, but a similar arrangement can be applied to the rear bearing box 25 also. In this case, as shown in FIG. 3, an orifice 47 may be formed in the collar 36 between the floating ring seal 31c placed in front of the rear end support bearing 5r for the outer shaft 7 and the labyrinth seal 32c adjacent thereto, and to passages 48 may be formed in an appropriate part of the rear bearing box 25 for communicating the floating ring seal 31d disposed behind the rear end support bearing 6r for the inner shaft 8 and the labyrinth seal 32d adjacent thereto.

More specifically, the rear bearing box 25 is divided into an outer chamber and an inner chamber. The outer chamber includes the communicating passages 48 and the parts exposed to the front end of the ring seal 31c adjoining the front end of the rear outer shaft bearing 5r and the rear end of the ring seal 31d adjoining the rear end of the rear inner shaft bearing 6r. The inner chamber includes the parts exposed to the rear end of the rear inner outer bearing 5r and the front end of the rear inner shaft bearing 6r, and communicates with the annular gap 49 defined between the outer and inner shafts 7 and 8.

The inner chamber of the front bearing box 21 communicates with the inner chamber of the rear bearing box 25 via the annular gap 49 defined between the inner circumferential surface of the outer shaft 7 and the outer circumferential surface of the inner shaft 8 so that a part of the lubricating oil which has lubricated the bearings 5f, 5r, 6f and 6r and the seal air which has passed through the floating ring seals 31a to 31d are drawn into the gear box GB communicating with the starter motor 26 via a drain hole (not shown in the drawings) provided along the length of the shaft of the drive bevel gear meshing with the bevel gear 33 fixed on an end of the outer shaft 7, and is expelled to the atmosphere via the bypass duct 22 while the lubricating oil is separated by an oil separator (not shown in the drawings) provided in the gear box GB.

Figure 4:
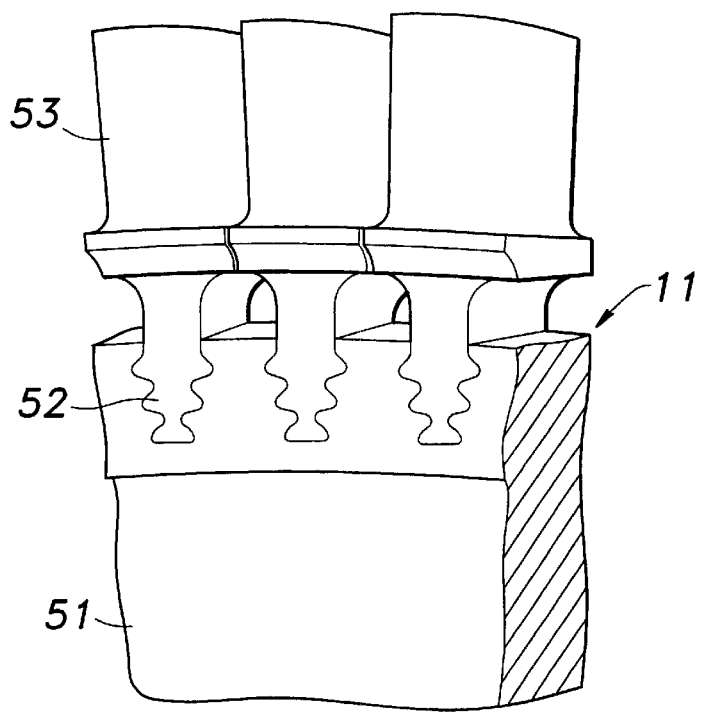
FIG. 4 is a fragmentary perspective view of the high pressure turbine.

A part of the high pressure air introduced into the high pressure chamber 46 is guided by a shroud 50 placed opposite the front surface of the turbine wheel 11 of the high pressure turbine HT, and flows along the front surface of the disk portion 51 of the turbine wheel 11. As shown in FIG. 4, turbine blades 53 are connected to the peripheral part of the disk portion 51 of the turbine wheel 11 each via a Christmas tree portion 52, and the aforementioned air flow cools the front face of the portions connecting the turbine blades 53 to the disk portion 51.

The collar 36 is provided with slots 55 similar to those of the hollow connecting shaft 35 so that the high pressure air which has passed into the hollow connecting shaft 35 and the gap 41 between the outer circumferential surface of the outer shaft 7 and the inner circumferential surface of the axial center of the high pressure turbine HT blows through across the turbine wheel 11 of the high pressure turbine HT. Thus, the backside of the connecting portions between the disk portion 51 and turbine blades 53.

The air which has cooled the connecting parts between the disk portion 51 and turbine blades 53 is guided by the shrouds 50 and 56 opposing the front and rear sides of the disk portion 51, and is ejected from the jet duct 14 drawn by the combustion gas ejected from the nozzles N of the reverse flow combustion chambers 10.

Thus, according to the present invention, because the high pressure air drawn from a part of the compressor is filled into a seal space extending from the front to rear bearing boxes at a uniform pressure, the seal pressure in the front and rear bearing boxes can be established in an effective manner without complicating the passages for supplying seal air.

Although the present invention has been described in terms of a preferred embodiment thereof, it is obvious to a person skilled in the art that various alterations and modifications are possible without departing from the scope of the present invention which is set forth in the appended claims.

What is claimed is:

1. A device for supplying seal air to bearing boxes of a gas turbine engine, comprising:

an inner shaft connected to rotors of a low pressure compressor and a low pressure turbine;

an outer shaft coaxially disposed with respect to said inner shaft;

a connecting shaft integrally attached to and coaxially surrounding said outer shaft and connected to rotors of a high pressure compressor and a high pressure turbine, an annular gap being defined between said connecting shaft and said outer shaft;

a front and a rear inner shaft bearing supporting a front and a rear end of said inner shaft, respectively;

a front and a rear outer shaft bearing supporting a front and a rear end of said outer shaft, respectively;

a front bearing box substantially enclosing said front inner shaft and front outer shaft bearing, said front bearing box being separated into an outer chamber exposed to a front end of said front inner shaft bearing and a rear end of said front outer shaft bearing, and an inner chamber exposed to a rear end of said front inner shaft bearing and a front end of said front outer shaft bearing;

a rear bearing box substantially enclosing said rear outer shaft and rear inner shaft bearings, said rear bearing box being separated into an outer chamber exposed to a front end of said rear outer shaft bearing and a rear end of said rear inner shaft bearing, and an inner chamber exposed to a rear end of said rear outer shaft bearing and a front end of said rear inner shaft bearing;

a first passage having a first end communicating with an output end said high pressure compressor and a second end communicating with said annular gap defined between said connecting shaft and outer shaft;

a second passage extending along an outer periphery of said outer shaft and a having a first end communicating with said annular gap and a second end communicating with said outer chamber of said front bearing box; and a third passage extending along an outer periphery of said outer shaft and having a first end communicating with said annular gap and a second end communicating with said outer chamber of said rear bearing box.

2. A device for supplying seal air to bearing boxes of a gas turbine engine according to claim 1, wherein said inner chamber of at least one of said bearing boxes communicates with another annular gap between said inner and outer shafts.

3. A device for supplying seal air to bearing boxes of a gas turbine engine according to claim 1, wherein said second and third passages each include a part having a cross section narrower than a cross section of said first passage.

4. A device for supplying seal air to bearing boxes of a gas turbine engine according to claim 1, wherein said second end of said first passage comprises a circumferentially elongated slot formed in said connecting shaft.

5. A device for supplying seal air to bearing boxes of a gas turbine engine according to claim 1, wherein said connecting shaft includes an extension extending in a rear part of said rotor of said high pressure turbine, said annular gap defined between said connecting shaft and outer shaft extending to said rear part of said rotor of said high pressure turbine, and orifices are provided in said connecting shaft extension for providing cooling air for a rear surface of said rotor of said high pressure turbine.

* * * * *